(12) United States Patent
Kataoka et al.

(10) Patent No.: US 8,004,139 B2
(45) Date of Patent: Aug. 23, 2011

(54) COMPRESSOR MOTOR AND COMPRESSOR

(75) Inventors: Yoshihiro Kataoka, Kusatsu (JP); Keiji Aota, Kusatsu (JP); Shin Nakamasu, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 260 days.

(21) Appl. No.: 12/444,603

(22) PCT Filed: Oct. 9, 2007

(86) PCT No.: PCT/JP2007/069694
§ 371 (c)(1),
(2), (4) Date: Apr. 7, 2009

(87) PCT Pub. No.: WO2008/044684
PCT Pub. Date: Apr. 17, 2008

(65) Prior Publication Data
US 2010/0096940 A1   Apr. 22, 2010

(30) Foreign Application Priority Data

Oct. 10, 2006 (JP) ................................ 2006-276080

(51) Int. Cl.
*H02K 1/27* (2006.01)
*H02K 21/14* (2006.01)
*F04B 39/00* (2006.01)

(52) U.S. Cl. ............................. 310/156.38; 310/156.53
(58) Field of Classification Search .............. 310/156.45
See application file for complete search history.

(56) References Cited

U.S. PATENT DOCUMENTS

| 5,811,904 | A | * | 9/1998 | Tajima et al. | 310/156.45 |
| 5,818,139 | A | * | 10/1998 | Yamagiwa et al. | 310/156.45 |
| 6,147,428 | A | | 11/2000 | Takezawa et al. | |
| 6,582,207 | B2 | * | 6/2003 | Matsumoto et al. | 417/410.1 |
| 6,987,341 | B2 | * | 1/2006 | Chang et al. | 310/156.45 |

FOREIGN PATENT DOCUMENTS

| EP | 1 850 452 A1 | 10/2007 |
| JP | 09-191588 A | 7/1997 |
| JP | 11-341719 A | 12/1999 |
| JP | 2004-301038 A | 10/2004 |
| JP | 2005-229798 A | 8/2005 |
| JP | 2006-254681 A | 9/2006 |

* cited by examiner

*Primary Examiner* — Burton Mullins
(74) *Attorney, Agent, or Firm* — Global IP Counselors

(57) ABSTRACT

A compressor motor includes a rotor and a stator disposed radially outside of the rotor. The rotor includes a rotor core, and a plurality of magnets circumferentially arranged on the rotor core at center angles of equal intervals. The rotor core has an axial length L and a radial length D. Each of the magnets has a thickness t. $L/D < 0.7$, and $t > (1 \times K \times N)/(L^{1.5} \times D \times P)$, where P is the number of poles, K is 100000, and N is a factor that depends on a compressor output.

3 Claims, 5 Drawing Sheets

COMPRESSOR MOTOR AND COMPRESSOR

CROSS-REFERENCE TO RELATED APPLICATIONS

This U.S. National stage application claims priority under 35 U.S.C. §119(a) to Japanese Patent Application Nos. 2006-276080, filed in Japan on Oct. 10, 2006, the entire contents of which are hereby incorporated herein by reference.

TECHNICAL FIELD

The present invention relates to a compressor motor, as well as a compressor having the compressor motor, which is to be used in, for example, air conditioners, refrigerators and the like.

BACKGROUND ART

Conventionally, a compressor includes a closed container, a compression element placed within the closed container, and a motor placed within the closed container and acting to drive the compression element via a shaft. The motor has a rotor, and a stator placed radially outside the rotor.

The rotor has a rotor core, and a plurality of magnets arrayed on the rotor core in its circumferential direction at center angles of equal intervals. The stator has a stator core, and a coil wound around the stator core (see JP H9-191588 A (JP 3017085 B)).

SUMMARY OF INVENTION

Technical Problem

However, with the conventional compressor shown above, there has been a problem that an attempt to shorten the axial length of the motor to achieve reduction in both size and weight of the motor would cause the motor efficiency to decrease. This is because shortening the axial length of the rotor core causes an increase in magnetic flux leakage from both axial end faces of the rotor so that the torque decreases.

More specifically, given an axial length L of the rotor core (i.e. rotor layering thickness) and a radial length D of the rotor core (i.e. rotor diameter), the magnetic flux leakage from both axial end faces of the rotor increases at a ratio of the following Equation (1) on condition that L/D<0.7:

$$\text{Flux decreasing index} = 1 - 1/((L/D)^{1.5} \times 100) \quad (1)$$

where Equation (1) is an empirically determined expression.

Then, a relationship between L/D and flux decreasing index is shown in FIG. 5. As can be seen from the prior art example indicated by unfilled circles in FIG. 5, the magnetic flux quantity derived from the rotor extremely decreases on condition that L/D<0.7. That is, on the assumption that L/D<0.7, an attempt to shorten the axial length L of the rotor core to shorten the axial length of the motor would cause the magnetic flux leakage from both axial end faces of the rotor to increase, so that the torque of the motor decreases.

In addition, for example, with regard to efficiency decreases, indeed there is a means for improving the coil space factor to improve the motor efficiency as shown in the literatures (JP H9-191588 A (JP 3017085 B)), but the torque decrease cannot be prevented by this means. This means also has a drawback that the coil winding quantity increases, leading to a cost increase.

Accordingly, an object of the present invention is to provide a compressor motor, as well as a compressor, which is a small-sized, lightweight and low-priced compressor motor or compressor and in which torque decreases due to large layering-thickness reduction of the rotor is suppressed.

Solution to Problem

In order to achieve the above object, there is provided a compressor motor comprising:
a rotor; and
a stator placed radially outside the rotor, wherein
the rotor has
a rotor core, and
a plurality of magnets arrayed on the rotor core in its circumferential direction at center angles of equal intervals, and wherein
given an axial length L of the rotor core (610), a radial length D of the rotor core and a thickness t of the magnets 620, it is satisfied that $$L/D < 0.7$$

and that $$t > (1 \times K \times N)/(L^{1.5} \times D \times P)$$

(where P is a number of poles, K is 100000, and N is a factor that depends on an output of the compressor).

With such a compressor motor in accordance with the present invention, given an axial length L of the rotor core, a radial length D of the rotor core and a thickness t of the magnets, it is satisfied that L/D <0.7 and that $t > (1 \times K \times N)/(L^{1.5} \times D \times P)$. Therefore, even if the axial length of the rotor core is shortened, torque decreases due to magnetic flux leakage from both axial end faces of the rotor can be prevented, so that efficiency decreases can be suppressed.

Accordingly, while torque decreases due to large reduction in layering thickness of the rotor are suppressed, a small-sized, lightweight, low-priced motor can be provided.

In accordance with one aspect of the present invention, it is satisfied that $$L/D > 0.2.$$

With such a compressor motor in accordance with this aspect of the present invention, since L/D >0.2, there is no need for extremely increasing the thickness t of the magnets. Thus, efficiency decreases due to magnetic flux leakage from both axial end faces of the rotor can be prevented.

Also, there is provided a compressor comprising:
a closed container;
a compression element placed within the closed container (1); and
the above compressor motor, which is placed within the closed container and which drives the compression element via a shaft.

With such a compressor in accordance with this aspect of the present invention, since the compressor motor as described above is included, a small-sized, lightweight, low-priced and high-performance compressor can be achieved.

Advantageous Effects of Invention

With such a compressor motor in accordance with the present invention, given an axial length L of the rotor core, a radial length D of the rotor core and a thickness t of the magnets, it is satisfied that L/D <0.7 and that $t > (1 \times K \times N)/(L^{1.5} \times D \times P)$. Therefore, there can be provided a small-sized, lightweight and low-priced motor in which torque decreases due to large reduction in layering thickness of the rotor are suppressed.

Further, with such a compressor in accordance with this aspect of the present invention, since the compressor motor as described above is included, a small-sized, lightweight, low-priced and high-performance compressor can be achieved.

DESCRIPTION OF EMBODIMENTS

Hereinbelow, the present invention will be described in detail by way of embodiment thereof illustrated in the accompanying drawings.

Figure 1:
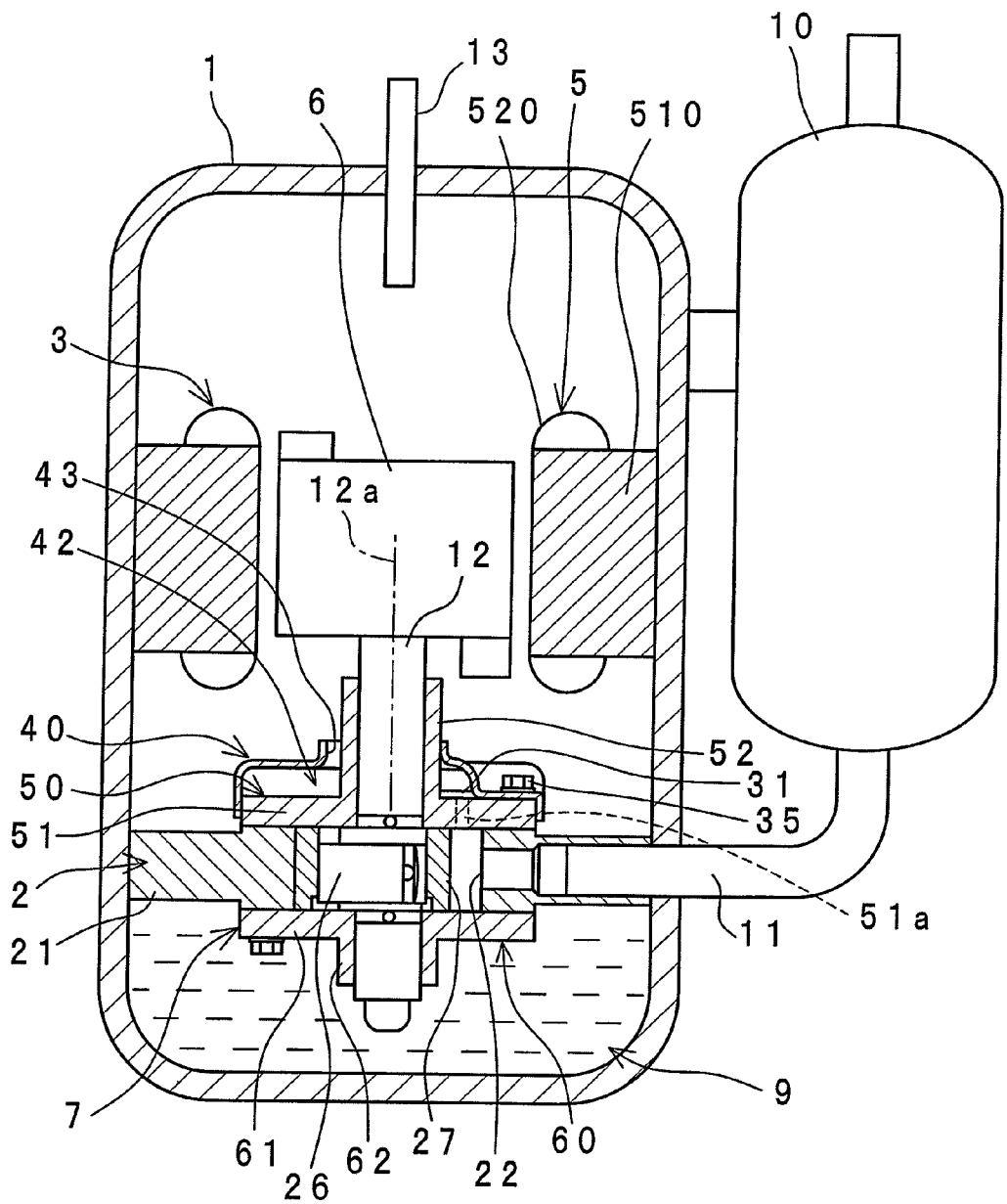
FIG. 1 is a longitudinal sectional view showing an embodiment of the compressor of the invention.

FIG. 1 shows a longitudinal sectional view according to an embodiment of the compressor of the invention. The compressor includes a closed container 1, a compression element 2 placed within the closed container 1, and a motor 3 placed within the closed container 1 and acting to drive the compression element 2 via a shaft 12.

This compressor is a so-called vertical high-pressure dome type rotary compressor, in which the compression element 2 is placed below and the motor 3 is placed above within the closed container 1. The compression element 2 is driven by a rotor 6 of the motor 3 via the shaft 12.

The compression element 2 sucks in a refrigerant gas from an accumulator 10 through a suction pipe 11. The refrigerant gas can be obtained by controlling unshown condenser, expansion mechanism and evaporator that constitute an air conditioner as an example of a refrigeration system together with the compressor. This refrigerant is, for example, carbon dioxide, R410A or R22.

In this compressor, a compressed high-temperature, high-pressure refrigerant gas is discharged from the compression element 2 to fill the closed container 1 therewith internally, while the refrigerant gas is passed through a gap between a stator 5 and the rotor 6 of the motor 3 to cool the motor 3. The refrigerant gas is thereafter discharged outside from a discharge pipe 13 provided on the upper side of the motor 3.

An oil reservoir 9 in which lubricating oil is accumulated is formed in lower portion of a high-pressure region within the closed container 1. This lubricating oil passes from the oil reservoir 9 via an oil passage (not shown) provided in the shaft 12 to move to sliding contact portions such as bearing of the compression element 2 and the motor 3, lubricating the sliding contact portions. This lubricating oil is, for example, polyalkylene glycol (polyethylene glycol or polypropylene glycol etc.) oil, ether oil, ester oil, or mineral oil. The oil passage is, for example, a spiral groove provided in the outer circumferential surface of the shaft 12 or a hole portion provided inside the shaft 12.

The compression element 2 includes a cylinder 21 fitted to an inner surface of the closed container 1, and an upper-side end plate member 50 and a lower-side end plate member 60 fitted to upper and lower opening ends of the cylinder 21, respectively. A cylinder chamber 22 is defined by the cylinder 21, the upper-side end plate member 50 and the lower-side end plate member 60.

The upper-side end plate member 50 has a disc-shaped body portion 51, and a boss portion 52 provided upwardly at a center of the body portion 51. The shaft 12 is inserted into the body portion 51 and the boss portion 52.

In the body portion 51 is provided a discharge hole 51a communicating with the cylinder chamber 22. A delivery valve 31 is mounted on the body portion 51 so as to be positioned on one side of the body portion 51 opposite to the side on which the cylinder 21 is provided. This delivery valve 31 is, for example, a reed valve which opens and closes the discharge hole 51a.

A cup-type muffler cover 40 is mounted on the body portion 51 on its one side opposite to the cylinder 21 so as to cover the delivery valve 31. The muffler cover 40 is fixed to the body portion 51 by a fixing member 35 (e.g., bolt). The boss portion 52 is inserted into the muffler cover 40.

The muffler cover 40 and the upper-side end plate member 50 define a muffler chamber 42. The muffler chamber 42 and the cylinder chamber 22 are communicated with each other via the discharge hole 51a.

The muffler cover 40 has a hole portion 43. By the hole portion 43, the muffler chamber 42 and an outer side of the muffler cover 40 are communicated with each other.

The lower-side end plate member 60 has a disc-shaped body portion 61, and a boss portion 62 provided downwardly at a center of the body portion 61. The shaft 12 is inserted into the body portion 61 and the boss portion 62.

In short, one end portion of the shaft 12 is supported by the upper-side end plate member 50 and the lower-side end plate member 60. That is, the shaft 12 is cantilevered. One end portion (on the support end side) of the shaft 12 intrudes into the cylinder chamber 22.

On the support end side of the shaft 12, an eccentric pin 26 is provided so as to be positioned within the cylinder chamber 22 of the compression element 2. The eccentric pin 26 is fitted to a roller 27. The roller 27 is placed revolvable in the cylinder chamber 22 so that compression action is exerted by revolving motion of the roller 27.

Next, compression action of the cylinder chamber 22 is described.

Figure 2:
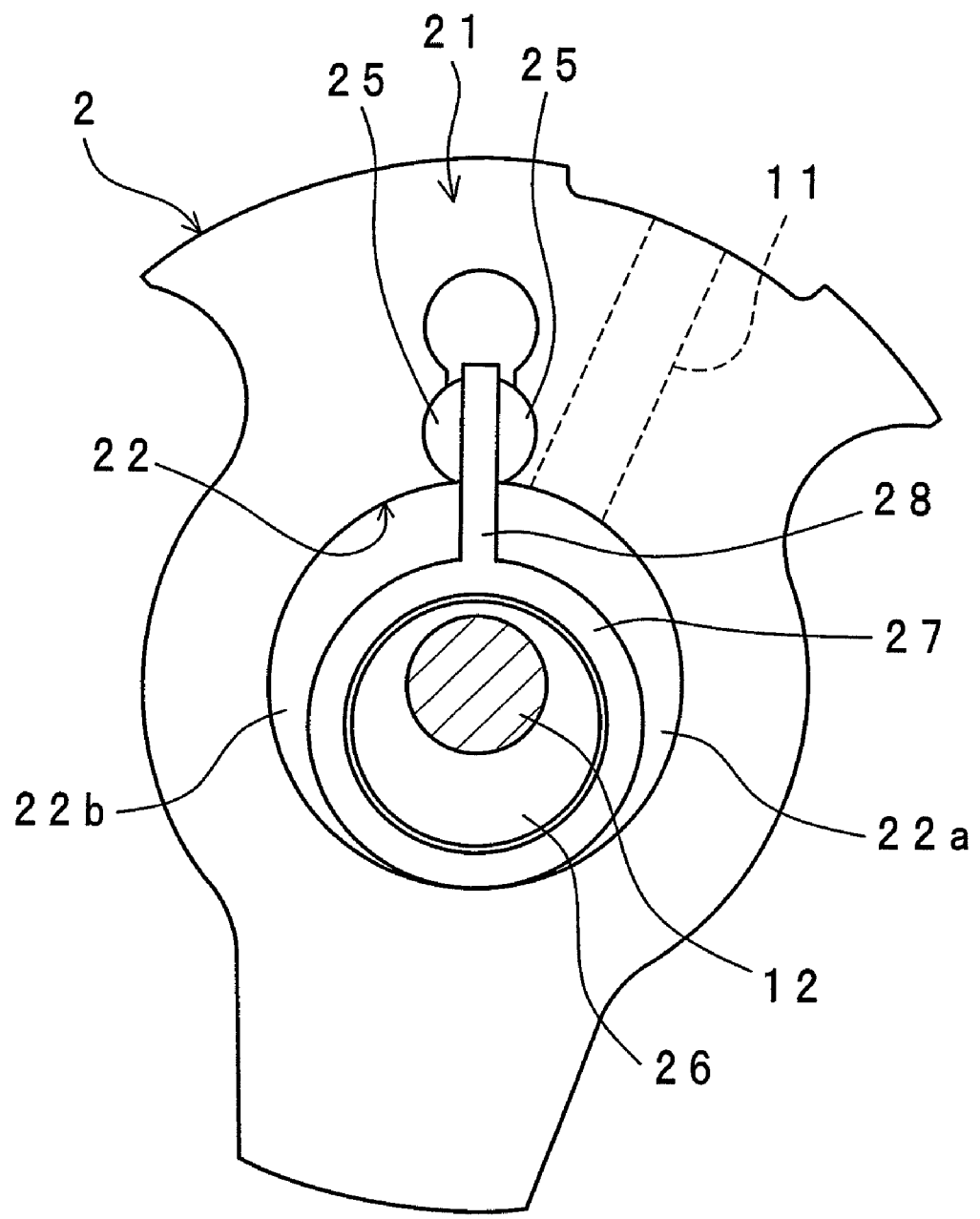
FIG. 2 is a plan view of a compression element.

As shown in FIG. 2, the cylinder chamber 22 is internally partitioned by a blade 28 integrally provided with the roller 27. That is, in a chamber on the right side of the blade 28, the suction pipe 11 is opened in the inner surface of the cylinder chamber 22 to form a suction chamber (low-pressure chamber) 22a. In a chamber on the left side of the blade 28, the discharge hole 51a (shown in FIG. 1) is opened in the inner surface of the cylinder chamber 22 to form a discharge chamber (high-pressure chamber) 22b.

Semicolumnar-shaped bushes 25, 25 are set in close contact with both surfaces of the blade 28 to provide a seal. Lubrication with the lubricating oil is implemented between the blade 28 and the bushes 25, 25.

Then, as the eccentric pin 26 eccentrically rotates along with the shaft 12, the roller 27 fitted to the eccentric pin 26 revolves while the outer circumferential surface of the roller 27 keeps in contact with the inner circumferential surface of the cylinder chamber 22.

As the roller 27 revolves in the cylinder chamber 22, the blade 28 moves back and forth while both side faces of the blade 28 are held by the bushes 25, 25. Then, the low-pressure refrigerant gas is sucked from the suction pipe 11 into the suction chamber 22a and compressed into a high pressure in the discharge chamber 22b, so that a high-pressure refrigerant gas is discharged from the discharge hole 51a (shown in FIG. 1).

Thereafter, as shown in FIG. 1, the refrigerant gas discharged from the discharge hole 51a is discharged via the muffler chamber 42 outward of the muffler cover 40.

Figure 3:
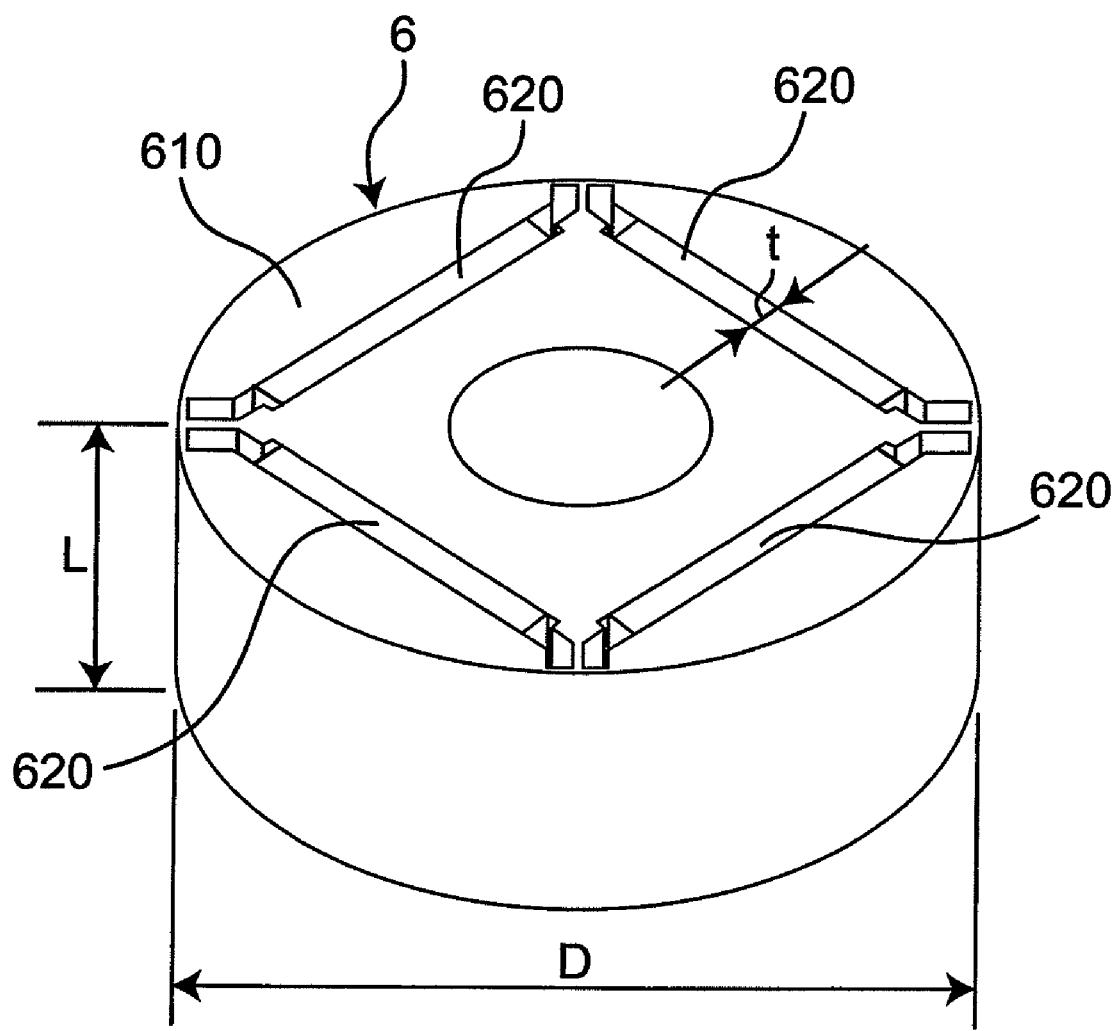
FIG. 3 is a perspective view of a rotor.

As shown in FIGS. 1 and 3, the motor 3 has the rotor 6, and the stator 5 placed radially outside the rotor 6 with an air gap interposed therebetween.

The rotor 6 has the rotor core 610, and four magnets 620 embedded in the rotor core 610. The rotor core 610 is cylindrical-shaped and formed of, for example, multilayered electromagnetic steel sheets. The shaft 12 is mounted at a central hole portion of the rotor core 610. The magnets 620 are flat-plate shaped permanent magnets. The four magnets 620 are arrayed at center angles of equal intervals in the circumferential direction of the rotor core 610.

The stator 5 has a stator core 510, and a coil 520 wound around the stator core 510. The stator core 510, formed of a plurality of multilayered steel plates, is fitted into the closed container 1 by press fit, shrinkage fit or the like. The rotor 6 is rotated together with the shaft 12 by electromagnetic force which is generated in the stator 5 by making a current flow through the coil 520.

Given an axial length L of the rotor core 610, a radial length D of the rotor core 610 and a thickness t of the magnets 620, it is satisfied that L/D<0.7 and that $t>(1 \times K \times N)/(L^{1.5} \times D \times P)$, where P is the number of poles, K is 100000 (as a correction value), and N is a factor responsive to an output of the compressor. N is shown in Table 1, Table 2 and Table 3 as an example, and determined by cylinder capacity and refrigerant type. The cylinder capacity refers to an effective compression capacity of the compression element 2, i.e., to a capacity of the cylinder chamber 22 corresponding to a maximum-quantity suction of the refrigerant gas into the cylinder chamber 22.

TABLE 1

| Cylinder capacity (cc) (with refrigerant R410A) | N |
|---|---|
| 5-12 | 1 |
| 12-16 | 2 |
| 16-20 | 2.5 |
| 20-30 | 3 |

TABLE 2

| Cylinder capacity (cc) (with refrigerant R22A) | N |
|---|---|
| 5-18 | 1 |
| 18-23 | 2 |
| 23-29 | 2.5 |
| 29-43 | 3 |

TABLE 3

| Cylinder capacity (cc) (with refrigerant $CO_2$) | N |
|---|---|
| 2-4 | 3 |
| 4-7 | 4 |

Figure 5:
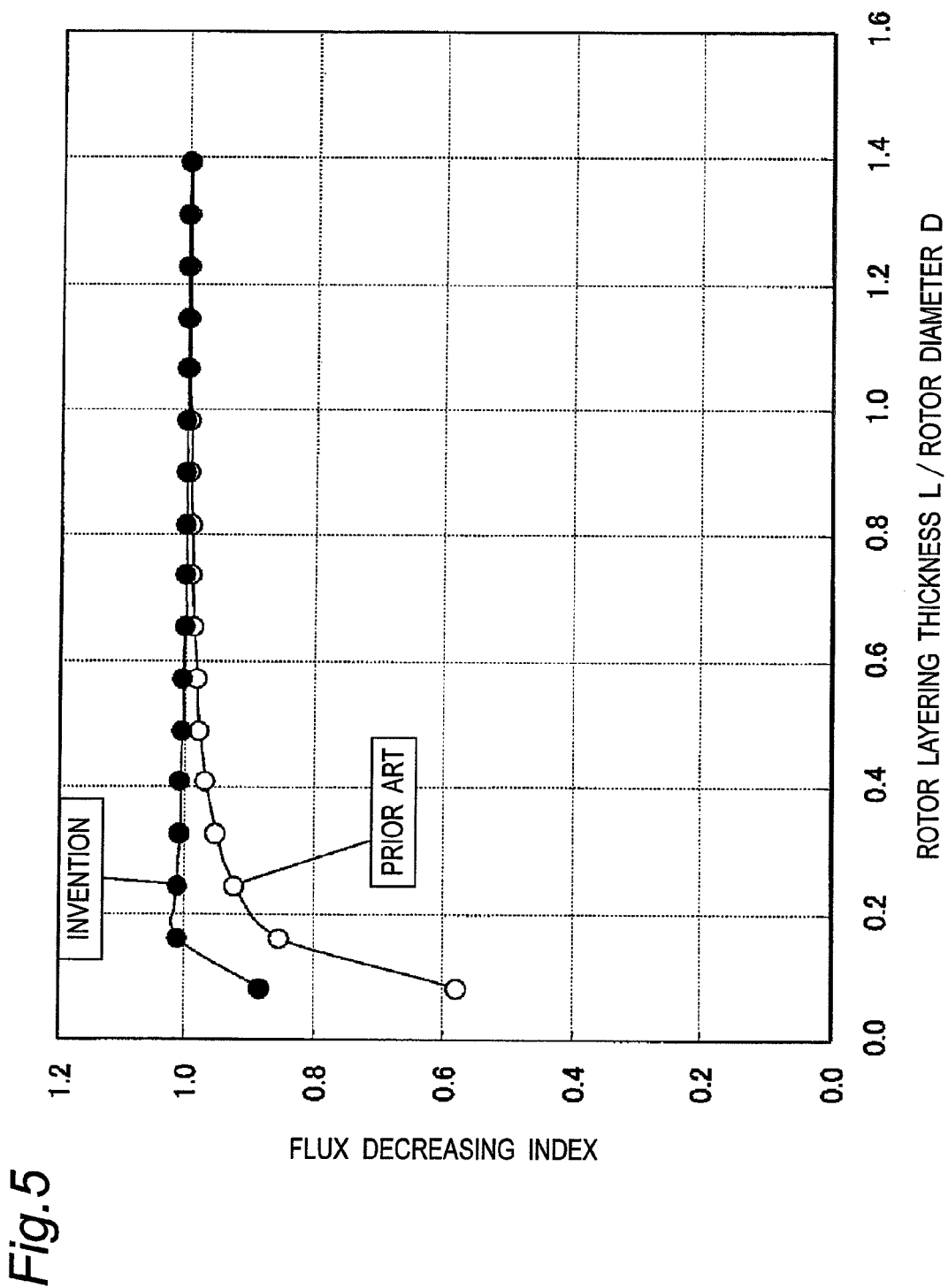
FIG. 5 is a graph showing a relationship between L/D and flux decreasing index.

According to the motor 3 of this constitution, the relationships that L/D<0.7 and that $t>(1 \times K \times N)/(L^{1.5} \times D \times P)$ are concurrently satisfied. Therefore, even if the axial length L of the rotor core 610 is shortened, torque decreases due to magnetic flux leakage from both axial end faces of the rotor 6 can be prevented, so that efficiency decreases can be suppressed. That is, the thickness t of the magnets 620 is made larger with shortening axial length L of the rotor core 610. More specifically, as can be seen from the present invention indicated by filled circles in FIG. 5, under the condition that L/D<0.7, flux decreases are prevented and torque decreases due to magnetic flux leakage from the rotor 6 are prevented.

Accordingly, while torque decreases due to large reduction in layering thickness of the rotor 6 are suppressed, a small-sized, lightweight and low-priced motor 3 can be provided.

Also, according to the compressor of this constitution, since the motor 3 is included, a small-sized, lightweight, low-priced and high-performance compressor can be realized.

Further, it is preferable that L/D>0.2. In this case, the thickness t of the magnets 620 do not need to be extremely increased, so that efficiency decreases due to magnetic flux leakage from both axial end faces of the rotor 6 can be prevented.

Given that L/D≦0.2, on the other hand, the thickness t of the magnets 620 needs to be extremely increased. The reason of this is that if L/D≦0.2, variations of relative axial positional shifts between the rotor 6 and the stator 5 cause a great disadvantageous influence on the efficiency due to magnetic flux leakage. More specifically, as can be seen from the present invention indicated by filled circles in FIG. 5, under the condition that L/D<0.2, flux decreases and magnetic flux leakage from the rotor 6 increases.

Figure 4:
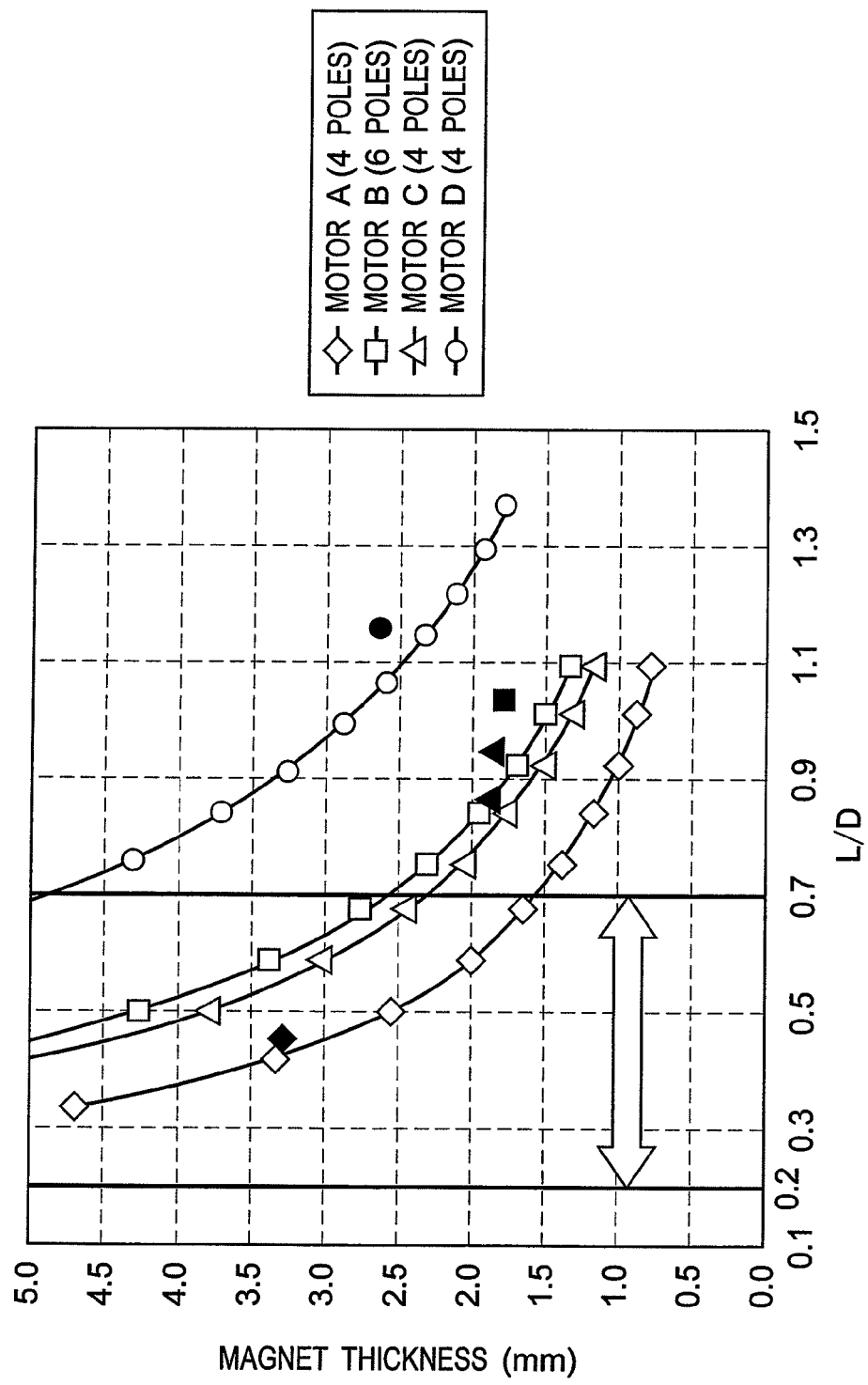
FIG. 4 is a graph showing a relationship between L/D and magnet thickness.

FIG. 4 shows a relationship between L/D and magnet thickness t (mm). Unfilled marks show magnet thicknesses determined by calculation of ($t=(1 \times K \times N)/(L^{1.5} \times D \times P)$), and filled marks show actual magnet thicknesses.

As can be seen from FIG. 4, the magnet thicknesses determined by the calculation and the actual magnet thicknesses are roughly equivalent to each other. Then, the motor 3 of the invention falls within the range of L/D<0.7 (preferably, 0.2<L/D<0.7).

The present invention is not limited to the above-described embodiment. For example, the compression element 2 may also be a rotary type one in which its roller and blade are provided independent of each other. The compression element 2 may further be a scroll type or reciprocating type one other than the rotary type.

The compression element 2 may yet further be a two-cylinder type one having two cylinder chambers. It is also allowable that the compression element 2 is provided above and the motor 3 is provided below. The compressor may also be a so-called low-pressure dome type compressor in which the closed container is filled with a refrigerant that is not yet compressed by the compression element. Further, the number of the magnets 620 may be freely increased or decreased.

What is claimed is:
1. A compressor motor comprising:
    a rotor; and
    a stator disposed radially outside of the rotor,
    the rotor including
        a rotor core having an axial length L and a diameter D, and
        a plurality of magnets circumferentially arranged on the rotor core at center angles of equal intervals, each magnet having a thickness t, wherein

L/D<0.7, and $t>(1 \times K \times N)/(L^{1.5} \times D \times P)$, where

P is a number of poles, K is 100000, and N is determined by cylinder capacity, i.e., an effective compression capacity of a compression element of a compressor and a refrigerant type and takes a value shown in Tables 1 through 3 below

TABLE 1

| Cylinder capacity (cc) (with refrigerant R410A) | N |
|---|---|
| 5-12 | 1 |
| 12-16 | 2 |
| 16-20 | 2.5 |
| 20-30 | 3 |

TABLE 2

| Cylinder capacity (cc) (with refrigerant R22A) | N |
|---|---|
| 5-18 | 1 |
| 18-23 | 2 |
| 23-29 | 2.5 |
| 29-43 | 3 |

TABLE 3

| Cylinder capacity (cc) (with refrigerant $CO_2$) | N |
|---|---|
| 2-4 | 3 |
| 4-7 | 4. |

2. The compressor motor as claimed in claim 1, wherein $L/D>0.2$.

3. A compressor including the compressor motor of claim 1, the compressor further comprising:
a closed container; and
a compression element disposed in the closed container, wherein
the compressor motor is disposed in the closed container to drive the compression element via a shaft.

* * * * *